US006459558B1

(12) United States Patent
Hashizawa et al.

(10) Patent No.: US 6,459,558 B1
(45) Date of Patent: Oct. 1, 2002

(54) POWER BREAKING DEVICE

(75) Inventors: Shigemi Hashizawa; Hidehiko Kuboshima; Masayuki Karamatsu; Hitoshi Uesugi, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/514,639

(22) Filed: Feb. 29, 2000

(30) Foreign Application Priority Data

Mar. 1, 1999 (JP) ........................................ 11-053232

(51) Int. Cl.⁷ ............................................. H02H 5/04
(52) U.S. Cl. ....................... 361/104; 337/186; 337/228
(58) Field of Search ................................ 361/103, 102, 361/104, 13, 833–835; 337/186, 198, 227, 228, 231, 234, 236, 237, 253, 380, 414

(56) References Cited

U.S. PATENT DOCUMENTS 4,126,368 A * 11/1978 Godfrey et al. ............ 337/198
4,473,268 A * 9/1984 Watanabe .................. 337/215
4,516,182 A * 5/1985 Franklin ..................... 361/13
4,752,243 A * 6/1988 Meidan ...................... 337/198
5,345,211 A * 9/1994 Muramatsu et al. ........ 337/186
5,477,409 A * 12/1995 Sayka ........................ 361/103
5,629,663 A * 5/1997 Seki et al. .................. 337/186
5,631,799 A * 5/1997 Sayka ........................ 361/103
5,933,310 A * 8/1999 Eggendorfer ............... 361/104
6,243,245 B1 * 10/2000 Totsuka et al. ............ 361/103
6,147,850 A * 11/2000 Gronowicz, Jr. ............ 361/103

FOREIGN PATENT DOCUMENTS

JP 10-83753 3/1998

* cited by examiner

*Primary Examiner*—Ronald W. Leja
(74) *Attorney, Agent, or Firm*—Finnegan, Henderson, Farabow, Garrett, & Dunner, L.L.P.

(57) ABSTRACT

A power breaking device 20 includes a stationary box 21, a fuse carrying box 23 and a guide and restricting mechanism 25. The stationary box 21 consists of a fixed housing 26, a load-side bus bar 27 and a power-side bus bar 28. The fuse carrying box 23 consists of a carrying box body 60 detachable to the stationary box 21 and a fuse fixing part 61 for carrying a fuse 22. The mechanism 25 is constituted by slits 41, 41 formed in a partition wall 34. The partition wall 34 is formed integrally with the fixed housing 26 to define an accommodating part 39 in which the fuse 22 is accommodated and retained. When the fuse carrying box 26 is fitted to the stationary box 21, the slits 41, 41 serve to introduce both terminals 24, 24 of the fuse 22 to a power-connecting part and a load-connecting part of the stationary box 21 and also restrict the displacement of the terminals 24, 24.

7 Claims, 6 Drawing Sheets

POWER BREAKING DEVICE

BACKGROUND OF THE INVENTION

1. Field of the Invention

The present invention relates to a power breaking device that is arranged between a power source and an electric load thereby to connect the power source with the electric load through a fuse and also insulate the power source from the electric load by detaching the fuse. Particularly, the invention relates to a power breaking device which is attached on the side of a power source of an electric car and which is suitable for insulating the power from the load electrically.

2. Description of the Related Art

FIGS. 1 and 2 show a power breaking device 1 which is used in an electric car or the like and which is capable of insulating a power (battery) from a load (e.g. driving motor etc.) electrically. In the power breaking device 1, a pair of terminals 3 are disposed at a designated distance in a housing 2 made of insulating material. Connected to the terminals 3, 3 are respective ends of wires 4, 4 that extend to the exterior of the housing 2. The housing 2 is provided, on its upside, with an opening which can be closed by a cover 5 rotatably connected to one side of the housing 2. A fuse 6 is fixed on the back face of the cover 5 through a band 7.

On condition that the opening of the housing 2 is covered with the cover 5, respective terminals 8, 8 of the fuse 6 are connected to the terminals 3, 3 in the housing 2, respectively. In this state, since the terminals 3, 3 are connected to each other through the fuse 6, the wires 4, 4 are electrically connected to each other.

When the cover 5 is opened, the terminals 8, 8 of the fuse 6 are detached from the terminals 3, 3 or electrical disconnection, so that the wires 4, 4 are insulated from each other, certainly.

In case of using the so-constructed power breaking device in the electric car, when carrying out the maintenance work (inspection of circuits, change of fuses, etc.), it is possible to certainly insulate the power source from the load by only opening the cover 5, whereby the safety in operation can be ensured.

In the above-constructed power breaking device, however, it is impossible to properly connect the terminals 8, 8 of the fuse 6 to the terminals 3, 3 in the housing 2 due to the structure where the fuse 6 is fixed on the back side of the cover 5 rotatably attached to the housing 2. Therefore, when fixing the fuse 6 on the back side of the cover 5, it is necessary to position the fuse 6 precisely, raising a problem that enormous care and labor is required for exchanging the fuse 6.

In order to solve the problem, the applicant has proposed a power breaking device 16 shown in FIG. 3 (Japanese Unexamined Patent Publication No. 10-83753). In the device 16, a lever assembly 10 is provided with male terminals 11, 11 to which terminals 13, 13 of a fuse 12 are fixed by means of screws. While, a box part 14 is provided with 15 female terminals 15, 15. The connection between the male terminals 11, 11 and the female terminals 15, 15 is carried out while adjusting the lever assembly 10 to the box part 14.

In the power breaking device 16, the positioning of the lever assembly 10 against the box part 14 allows the male terminals 11 to be connected to the female terminals 15, 15 appropriately. Additionally, since the exchange of the fuse 12 is attained by only fixing the terminals 13, 13 of the fuse 12 to the male terminals 11, 11 by screws, there is no need of enormous care and labor in the exchange operation.

However, the above-mentioned power breaking device 16 also requires a structure for fitting the lever assembly 10 to a designated position on the box part 14, a structure for fixing the female terminals 15, 15 to designated positions in the box part 14 and a structure for fixing the terminals 13, 13 of the fuse 12 to the lever assembly 10. Therefore, the whole structure of the device 16 is complicated with an increased number of components.

SUMMARY OF THE INVENTION

Under such a circumstance, it is therefore an object of the present invention to provide a power breaking device which facilitates the exchanging operation of the fuse and which can be constructed by a reduced number of components owing to the device's simple structure.

The object of the present invention described above can be accomplished by a power breaking device arranged between a power source and an electric load for connecting the power source with the electric load through a fuse and disconnecting the power source from the electric load by detachment of the fuse, the power breaking device comprising:

- a stationary box provided, therein, with a power connection part connected to the power source and a load connection part connected to the electric load;
- a fuse carrying box which is constructed so as to accommodate and retain the fuse therein, the fuse carrying box being detachably attached to the stationary box and also insulating the power source from the electric load when the fuse carrying box is detached from the stationary box; and
- a guide and restricting mechanism for respectively guiding both terminals of the fuse into the power connection part and the load connection part while restricting the terminals movements on condition that the fuse carrying box is fitted to the stationary box.

Owing to the provision of the guide and restricting mechanism, it is possible to position the fuse with ease.

In the above-mentioned power breaking device, preferably, the stationary box comprises:

- a fixed housing;
- a load-side bus bar which is provided, on one end thereof, with a load-side terminal connected with the electric load and which is also provided, on the other end, with a first elastic connecting part for connection with one terminal of the fuse, the first elastic connecting part being retained in the fixed housing; and
- a power-side bus bar which is provided, on one end thereof, with a power-side terminal connected with the power source and which is also provided, on the other end, with a second elastic connecting part for connection with the other terminal of the fuse, the second elastic connecting part being retained in the fixed housing.

According to the present invention, since the terminals of the fuse are directly connected to the first and second elastic connecting parts of the load-side bus bar and the power-side bus bar, it is possible to reduce the number of components.

In the power breaking device, more preferably, the fuse carrying box comprises:

- a box body detachably mounted to the stationary box; and
- a fuse fixing part arranged in the box body to accommodate the fuse therein.

In the power breaking device, more preferably, the guide and restricting mechanism is constructed so as to guide the connection of the respective terminals of the fuse with the first and second elastic connecting parts and also constructed so as to restrict the movements of the respective terminals of the fuse on condition that the terminals of the fuse are connected with the first and second elastic connecting parts, respectively.

In the power breaking device, more preferably, the guide and restricting mechanism comprises:

- a partition wall formed integrally with the fixed housing to define an accommodating part for accommodating the fuse therein; and
- a pair of slits formed in the partition wall;
- whereby the respective terminals of the fuse are connected with the first and second elastic connecting parts since the respective terminals pass through the pair of slits.

In this case, when the fuse carrying box is fitted to the stationary box, the terminals of the fuse are introduced to the first and second elastic connecting parts through the slits. On condition that the terminals of the fuse are connected to the first and second elastic connecting parts, the movements of the terminals are restricted by respective inner walls of the slits.

In the power breaking device, more preferably, the fixed housing is provided with at least one guide rib which is positioned outside the fuse carrying box in engagement with the stationary box, thereby to restrict the deformation of the fuse carrying box.

When fitting the fuse carrying box to the stationary box, the movement of the fuse carrying box is guided by the guide rib in contact with the outer periphery of the fuse carrying box. Therefore, it is possible to fit the fuse carrying box to the stationary box with ease.

Now, providing that the fuse carrying box is separated from the stationary box for purpose of disconnecting the terminals of the fuse from the first and second elastic connecting parts, it may be expected that the fuse carrying box is deformed by resistance derived from the elastic connection between the terminals and the first and second elastic connecting parts. Nevertheless, according to the invention, the guide rib on the fixed housing operates to restrict the deformation of the fuse carrying box, Therefore, it is possible to detach the terminals of the fuse from the first and second elastic connecting parts while preventing the fuse from falling down from the fuse carrying box.

In the power breaking device, more preferably, the power breaking device further comprises a locking mechanism for locking the fuse carrying box in engagement with the stationary box, wherein the locking mechanism includes:

- a pair of locking levers rotatably attached to both sides of the fuse carrying box in the longitudinal direction; and
- a pair of engagement projections formed on the fixed housing for engagement with the locking levers.

In this case, when the locking levers are rotated to engage the engagement projections on condition of fitting the fuse carrying box to the stationary box, the resultant fitting condition can be maintained. When it is desired to separate the fuse carrying box from the stationary box, it is carried out to disengage the locking levers from the engagement projections. Consequently, the fuse carrying box can be detached from the stationary box with case. In connection, since the locking levers re rotatably attached to both sides of the fuse carrying box in the longitudinal direction, it is also expected to improve the efficiency in utilizing space in the neighborhood of the power breaking device.

These and other objects and features of the present invention will become more fully apparent from the following description and appended claims taken in conjunction with the accompany drawings.

DESCRIPTION OF THE PREFERRED EMBODIMENT

Figure 1:
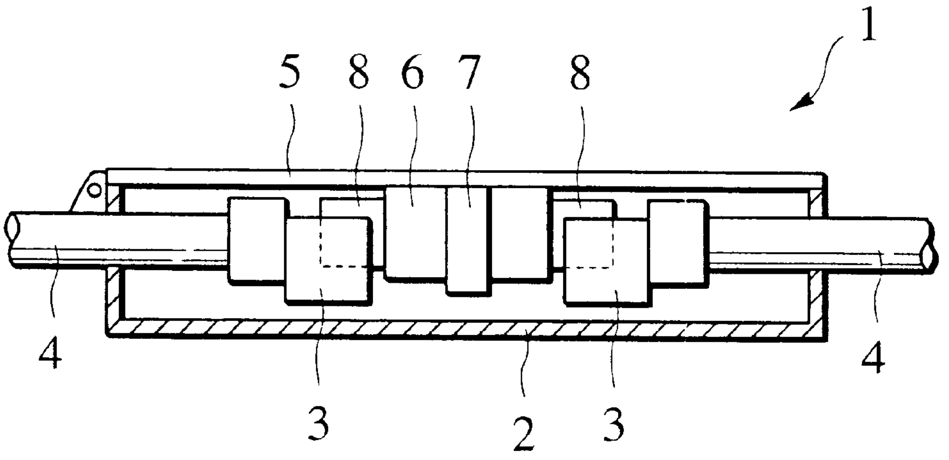
FIG. 1 PRIOR ART
FIG. 1 is a sectional view showing the interior of a power breaking device in the prior art.
Figure 2:
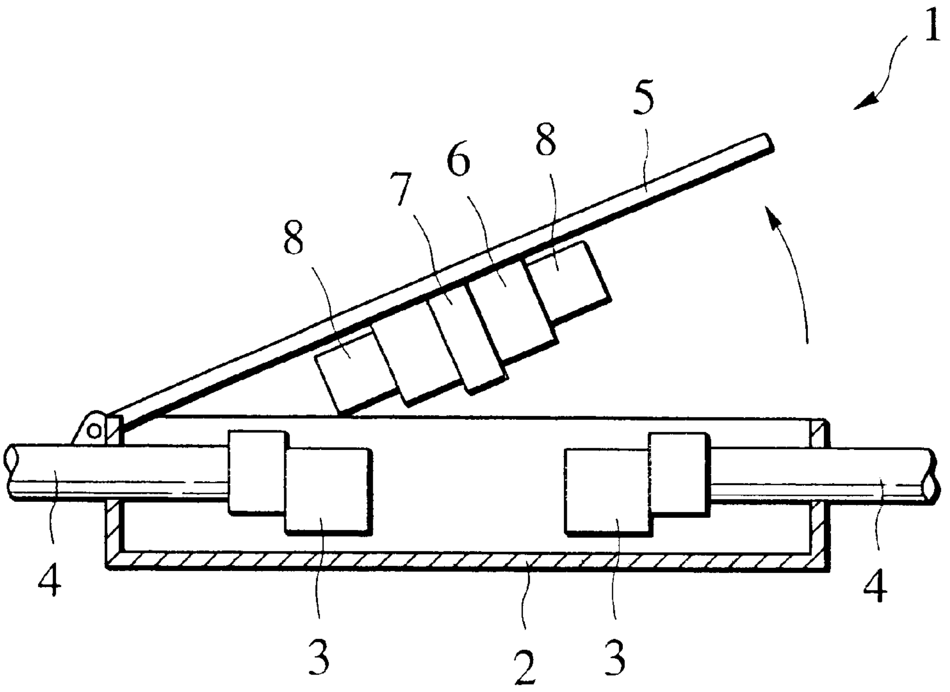
FIG. 2 PRIOR ART
FIG. 2 is a sectional view showing the operation of the power breaking device of FIG. 1.
Figure 3:
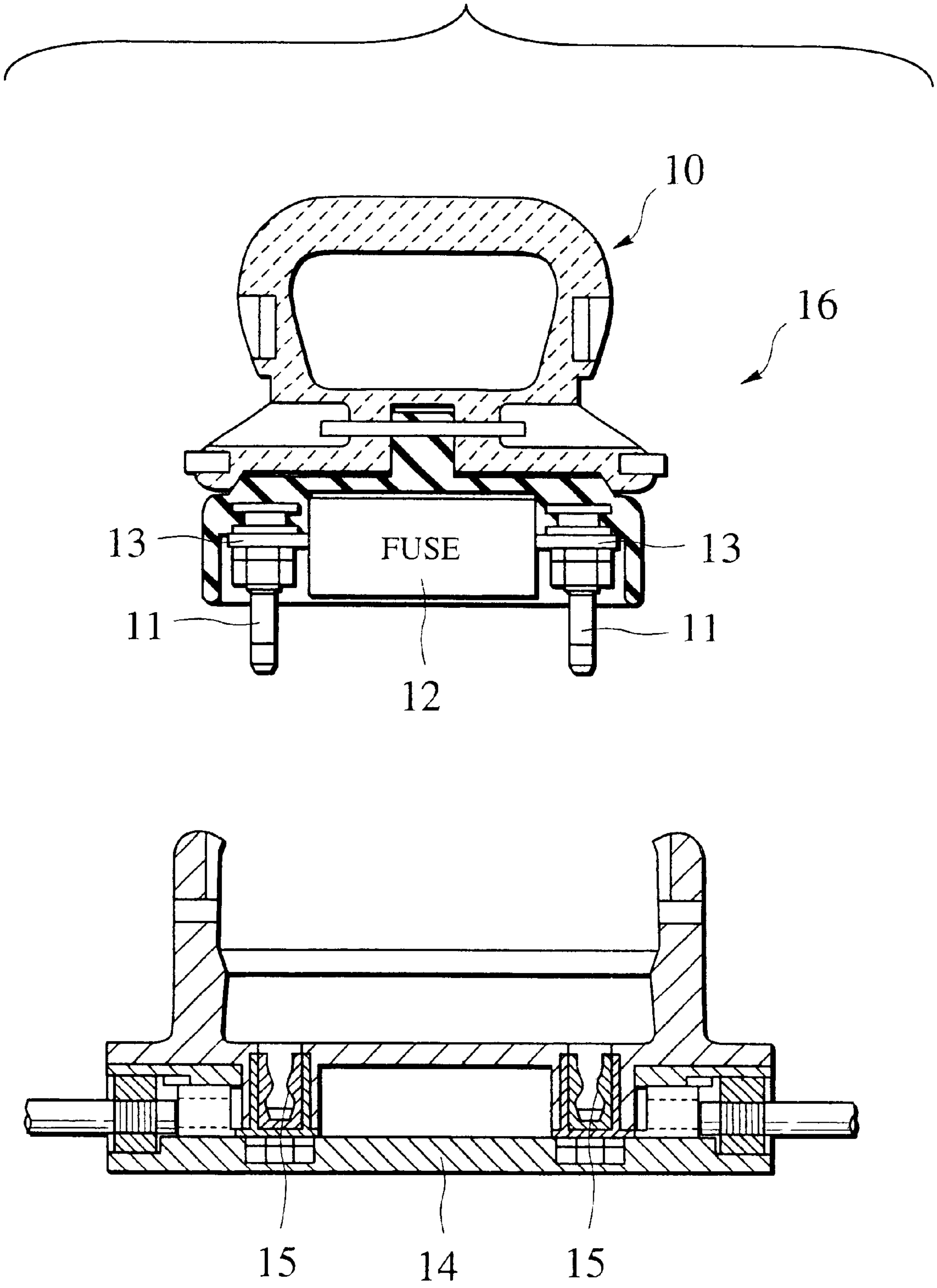
FIG.3 PRIOR ART
FIG. 3 is a sectional view showing the interior of another power breaking device in the prior art.
Figure 4:
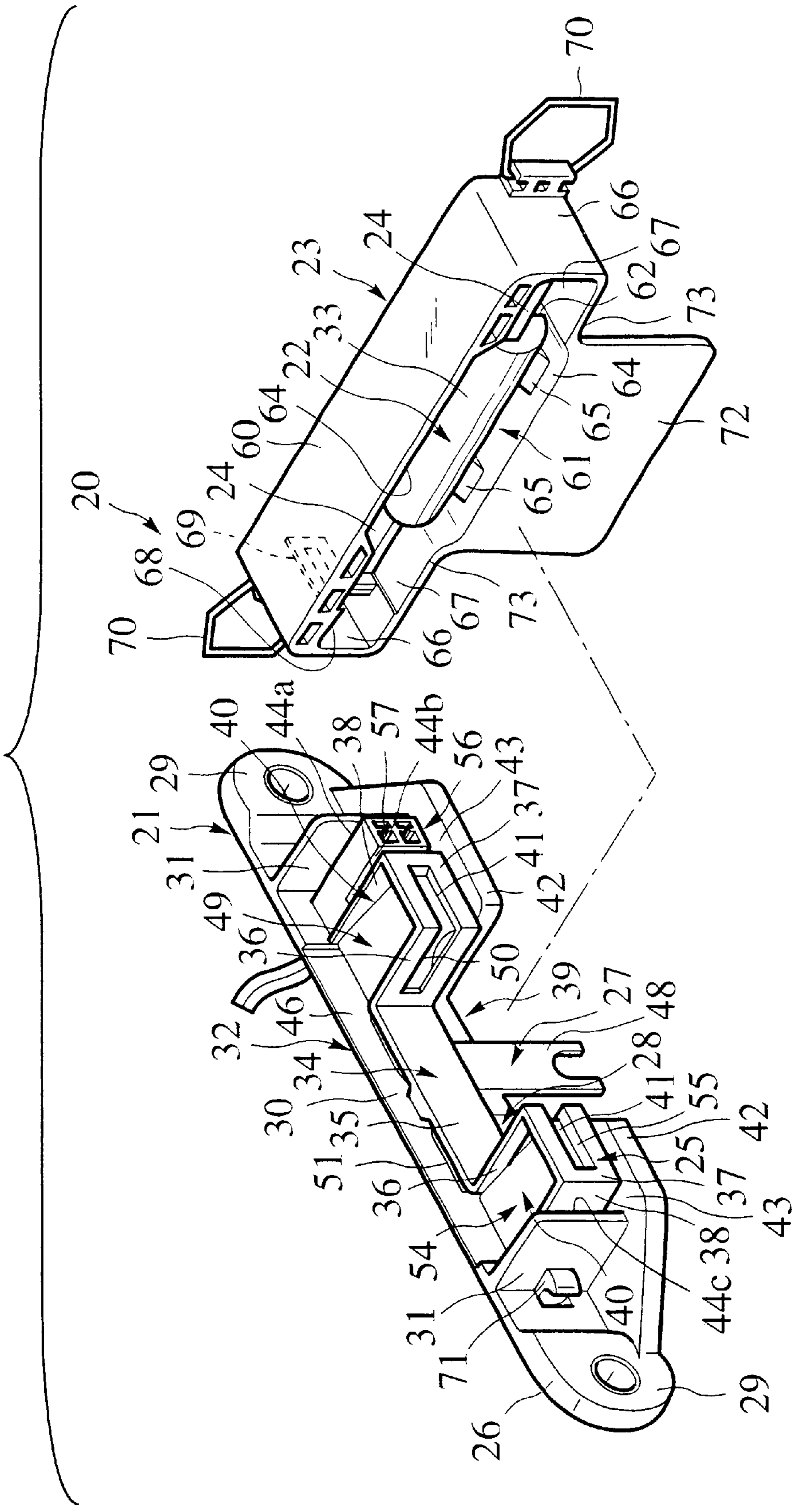
FIG. 4 is a perspective view of a power breaking device in accordance with an embodiment of the invention.
Figure 5:
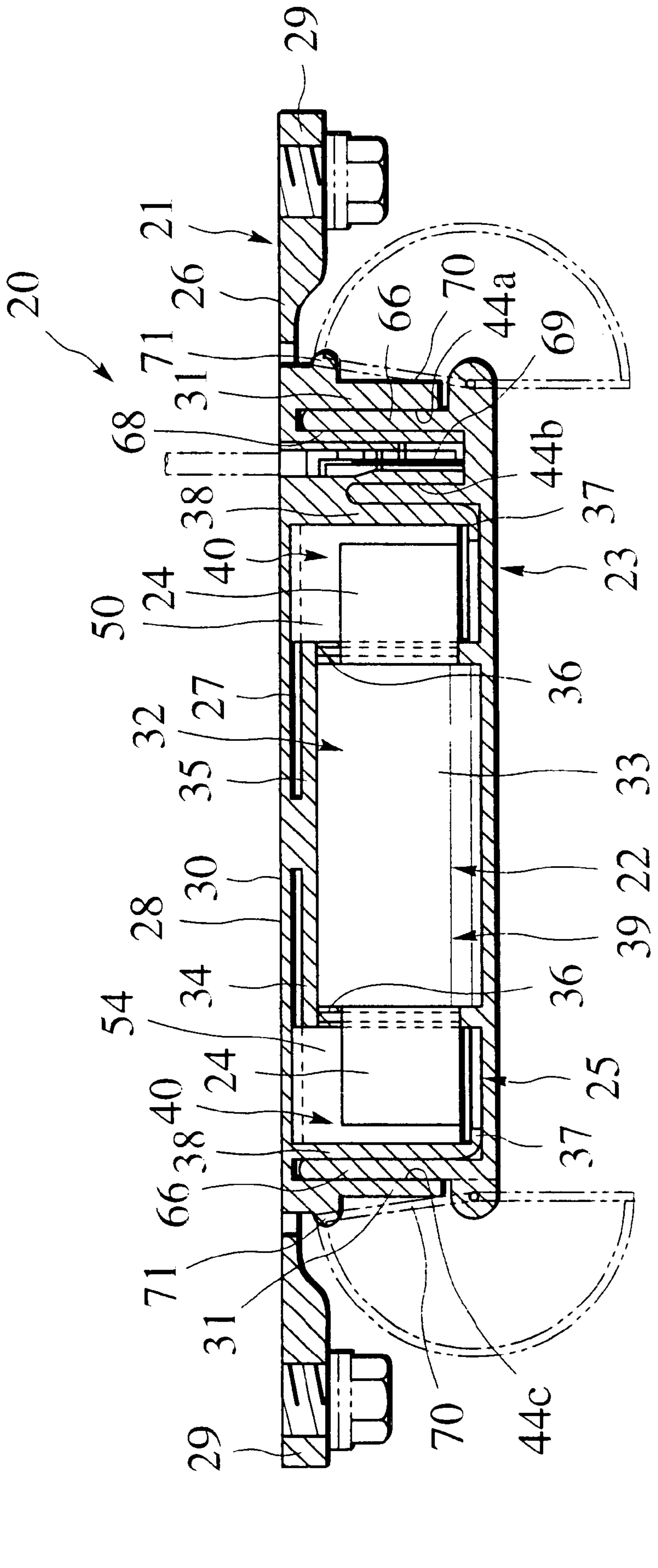
FIG. 5 is a sectional view of the power breaking device in accordance with the embodiment of the invention.

One embodiment of the present invention will be described with reference to the drawings. FIG. 4 is a perspective view of a power breaking device 20 in accordance with an embodiment of the invention. FIG. 5 is a sectional view of the power breaking device 20.

As shown in FIGS. 4 and 5, the power breaking device 20 is constituted by a stationary box 21 fixed on the side of a power source (not shown) and a fuse carrying box 23 in which a fuse 22 for a great current is accommodated and which is detachable from the stationary box 21. The power breaking device 20 of the embodiment is equipped with a guide and restricting mechanism 25. When installing the fuse carrying box 23 on the stationary box 21, the mechanism 25 operates to respectively guide both terminals 24, 24 of the fuse 22 to a power connecting part and a load connecting pan in the stationary box 21, while restricting the displacement of the terminals 24, 24.

The power breaking device 20 is arranged between the power source and a not-shown electric load. The device 20 serves to connect the power source with the load through the fuse 22 and also disconnect the former from the latter by removing the fuse 22.

Figure 6A:
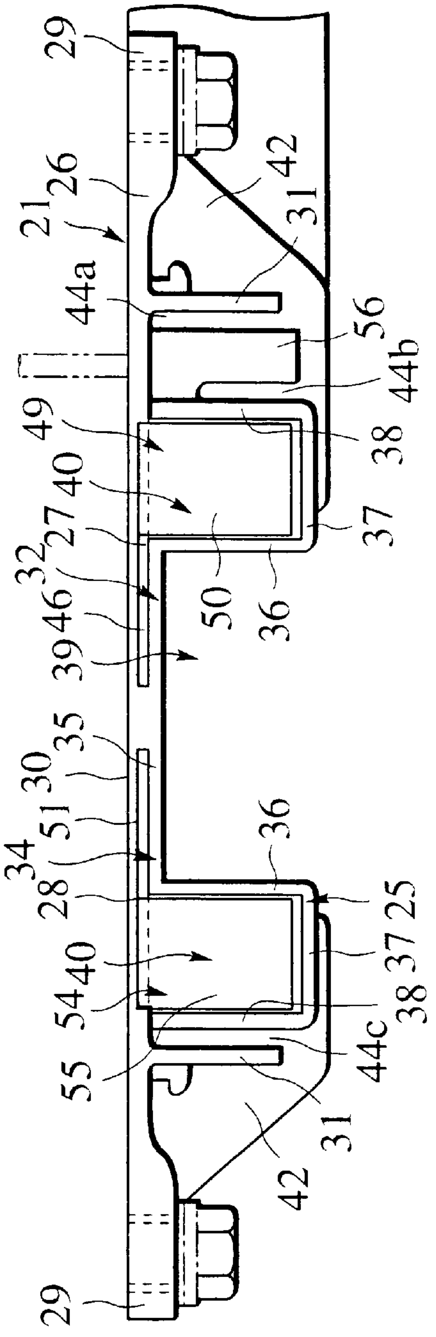
FIG. 6A is a plan view of a fixed box.
Figure 6B:
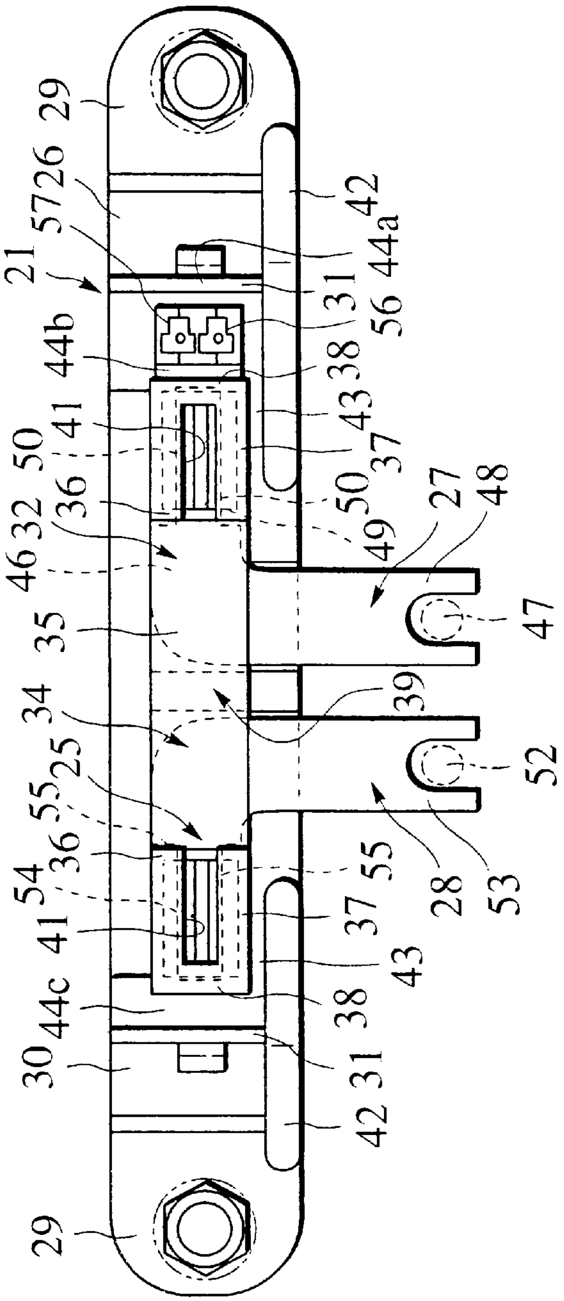
FIG. 6B is a front view of the fixed box.

As shown in FIGS. 6A and 6B, the stationary box 21 includes a fixed housing 26 in the form of a long member, a load-side bus bar 27 and a power-side bus bar 28 both assembled to the fixed housing 26. Two fixing parts 29, 29 for the power source (battery) are respectively formed on both sides of the fixed housing 26 in the longitudinal direction. A support wall 30 in the form of a plate is formed between the fixing parts 29, 29. Vertical walls 31, 31 are formed so as to project from the support wall 30 on respective sides of the fixing pans 29, 29. On one side of the support wall 30, a fuse-fitting part 32 is defined between the vertical walls 31, 31.

In the fuse-fitting part 32, a partition wall 34 to define a space for receiving a main body 33 of the fuse 22 is formed integrally with the support wall 30. The partition wall 34 comprises a base plate 35 provided apart from the support wall 30 at a predetermined distance, a pair of axial walls 36, 36 extending from both sides of the base plate 35 to the same direction as the vertical walls 31, 31, a pair of insertion walls

37, 37 succeeding to the axial walls 36, 36 in substantial parallel with the support wall 30 and a pair of side walls 38, 38 extending from the insertion walls 37, 37 toward the support wall 30 in substantial parallel with the axial walls 38, 38.

Defined by the base plate 35 and the opposing axial walls 36, 36 is an accommodating part 39 on which the main body 33 of the fuse 22 is mounted. On both sides of the accommodating part 39, rectangular terminal accommodating parts 40, 40 are defined by the support wall 30, the axial walls 36, 36, the insertion walls 37, 37 and the side walls 38, 38. Further, guide slits 41, 41 are continuously formed in the axial walls 36, 36 and the insertion walls 37, 37. Each guide slit 41 is formed to have a width allowing each terminal 24 of the fuse 22 to be inserted.

A connector part 56 is arranged between one side wall 38 and the vertical wall 31 integrally. Vertical insertion parts 44*a*, 44*b*are defined between one side of the connector part 56 and Vertical wall 31 and between the other side of the part 56 and one side wall 38, respectively. Similarly, an additional vertical insertion part 44*c* is defined between the other side wall 38 and the other vertical wall 31.

The connector part 56 is provided, at an interior thereof, with a terminal accommodating chamber 57 that accommodates a female terminal 58 therein. The female terminal 58 is connected to a male terminal 59 in a fuse carrier box 23 mentioned later.

On the underside of the terminal accommodating parts 40, 40, plate-shaped guide ribs 42, 42 are respectively formed so to project from the support wall 30. Horizontal insertion parts 43, 43 are formed between the top faces of the guide ribs 42, 42 and the underside face of the partition wall 34. In assembly, both side walls 66, 66, a partition wall 63 and guide walls 73, 73 of the fuse carrier box 23 are respectively inserted into the vertical insertion parts 44*a*, 44*b*, 44*c* and the horizontal insertion part 43, 43.

The above load-side bus bar 27 comprises a bus-bar body 46, a plate terminal 48 connected to a terminal 47 on the load's side (see FIG. 6B) by a screw, and an elastic connecting part 49 connected to one terminal 24 of the fuse 22. The plate terminal 48 is formed so as to project from the accommodating part 39 downward. The bus-bar body 46 is disposed between the support wall 30 and the base plate 35, while the elastic connecting part 49 is arranged in the terminal accommodating part 40.

The elastic connecting part 49 is provided with a pair of elastic pieces 50, 50. A clearance between the opposing elastic pieces 50, 50 corresponds to the guide slit 41 extending from the axial wall 36 to the insertion wall 37. With this arrangement, the terminal 24 of the fuse 22 passing through the slit 41 is inserted between the elastic pieces 49, 49 and elastically pinched therebetween into the electrical connection. Then, the terminals 24, 24 of the fuse 22 are inserted into the terminal accommodating parts 40, 40 through the slits 41, 41 of the insertion walls 37,37.

The power-side bus bar 28 is configured in symmetry with the load-side bus bar 27. The bus bar 28 comprises a bus-bar body 51, a plate terminal 53 fixed to a terminal 53 on the power's side (see FIG. 6B) by a screw, and an elastic connecting part 54 connected to the other terminal 24 of the fuse 22. Being in parallel with the terminal 48 of the load-side bus bar 27 substantially, the plate terminal 53 is also formed so as to project from the accommodating part 39 downward. The bus-bar body 51 is disposed between the support wall 30 and the base plate 35, while the elastic connecting part 54 is arranged in the terminal accommodating part 40.

Similarly to the load-side bus bar 27, the elastic connecting part 54 is provided with a pair of elastic pieces 55, 55. A clearance formed between the opposing elastic pieces 55, 55 corresponds to the guide slit 41 extending from the axial wall 36 to the insertion wall 37. With this arrangement, the other terminal 24 of the fuse 22 passing through the slit 41 is inserted between the elastic pieces 55, 55 and elastically pinched therebetween into the electrical connection.

Accordingly, once the fuse carrying box 23 is fitted to the stationary box 21 into one body, then the load-side bus bar 27 is electrically connected to the power-side bus bar 28 through the fuse 22, namely, the load is connected to the power source through the fuse 22.

Figure 7A:
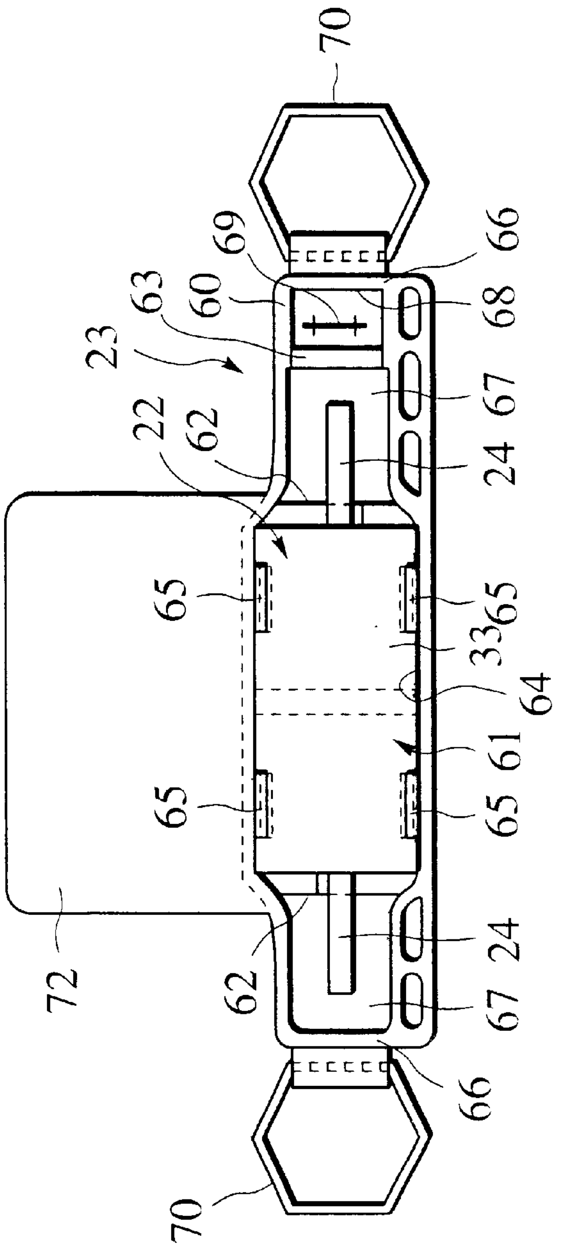
FIG. 7A is a plan view of a fuse carrying box.
Figure 7B:
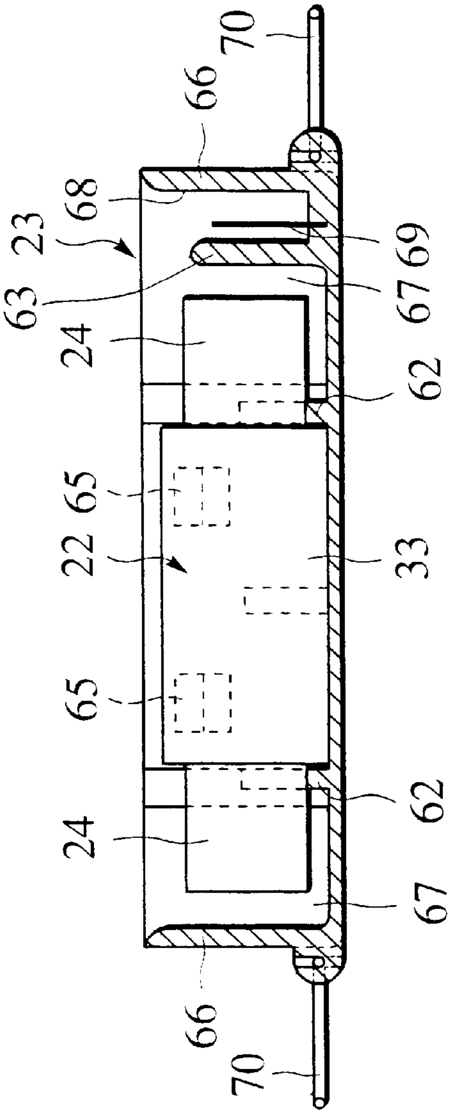
FIG. 7B is a sectional view of the fuse carrying box.

The fuse carrying box 23 consists of a carrying box body 60 having one opened side and a fuse fixing part 61 arranged in the box body 60 for accommodating the fuse 22 therein. The interior of the box body 60 is formed so as to define a broad space at the substantial intermediate portion and narrow spaces on both sides of the substantial intermediate portion. On both sides of the broad space in the longitudinal direction of the box 23, respective stopper walls 62, 62 are formed, as shown in FIGS. 7A and 7B. The main body 33 of the fuse 22 is inserted between the stopper walls 62, 62.

In the broad space, four stopper projections 65, 65, 65, 65 are formed on both inner walls in the direction of a width of the box 23, Each stopper projection 65 is arc-shaped so as to follow the outer profile of the main body 33 of the fuse 23. With this formation, the main body 23 of the fuse 22 inserted into the stopper walls 62, 62 can be carried by the stopper projections 65, 65, 65, 65.

In order to draw the fuse 22 out of the box 23, it is necessary to apply a force in a direction to pull out the fuse 22 between the stopper walls 62, 62, on the fuse 22. Consequently, the inner walls 64, 64 of the box body 60 are curved outward in the direction of the width of the box 23, so that the main body 33 can be drawn out while riding over the stopper projections 65, 65.

Outside each of the stopper walls 62, 62, a terminal inserting part 67 is formed between the side wall 66 and the stopper wall 62. Further, a partition wall 63 is formed adjacently to one terminal inserting part 67. A hood pat 68 is defined by the partition wall 63 and one of the side walls 66. A male terminal 69 is arranged to project into the hood part 68. When the fuse carrying box 23 is engaged with the stationary box 21, the female terminal 58 accommodated in the connector part 56 is connected to the male terminal 69 in the hood part 78. With this connection between the female terminal 58 and the male terminal 69, it is electrically detected that the fuse carrying box 23 has been integrated with the stationary box 23.

On both sides of the fuse carrying box 23 in the longitudinal direction, two locking levers 70, 70 are rotatably attached to the side walls 66, 66, respectively. By bending a wire to be hexagonal, each locking lever 70 is constructed to be expandable. A pair of engagement projections 71, 71 are formed on the vertical walls 31, 31 of the stationary box 21. These locking levers 70, 70 and the engagement projections 71, 71 constitute a locking mechanism of the invention.

After fitting the fuse carrying box 23 to the stationary box 21, the integration can be maintained by rotating the locking levers 70, 70 to engage them with the engagement projections 71, 71.

A cover part 72 in the form of a flat plate is formed integrally with the fuse carrying box 23. When the fuse carrying box 23 is fitted to the stationary box 21, the cover part 72 is inserted between the axial walls 36, 36 to cover respective front faces of the load-side bus bar 27 and the power-side bus bar 28.

In order to fit the fuse carrying box 23 to the stationary box 21, the inner walls 64 on one side of the box 21 is inserted into the horizontal insertion part 43, which is defined between the guide rib 42 and the insertion wall 37, and also inserted into the vertical insertion part 44 between the vertical wall 31 and the side wall 38. Similarly, the inner walls 64 on the other side of the box 21 is also inserted into the horizontal insertion part 43 between the guide rib 42 and the insertion wall 37 and also inserted into the vertical insertion part 44 between the vertical wall 31 and the connector part 56.

When both sides of the inner wail 64 are respectively inserted into the vertical insertion part 44 and the horizontal insertion part 43, the main body 33 of the fuse 22 is inserted into the accommodating part 39. Passing through the slits 41, 41 respectively, the terminals 24, 24 of the fuse 22 are elastically pinched between the elastic pieces 50, 50 of the load-side bus bar 27 and between the elastic pieces 55, 55 of the power-side bus bar 28.

Thereafter, by rotation of the locking levers 70, 70 for engagement with the engagement projections 71, 71, the fuse carrying box 23 can be secured to the stationary box 21. Under such a situation, the load-side bus bar 27 is electrically connected to the power-side bus bar 28 through the fuse 22, so that the electric load is connected with the power source.

When it is desired to detach the fuse carrying box 23 from the stationary box 21, it is firstly executed to rotate the lock levers 70, 70 for disengagement from the engagement projections 71, 71. Next, it is executed to draw the box body 60 apart from the fixed housing 26. In this way, the fuse carrying box 23 can be detached from the stationary box 21 thereby to insulate the load-side bus bar 27 from the power-side bus bar 28.

According to the power breaking device of the embodiment, owing to the arrangement where the terminals 24, 24 of the fuse 22 are directly connected to the elastic connecting parts 49, 54 of the load-side bus bar 27 and the power-side bus bar 28 respectively, it is possible to reduce the number of components and the manufacturing cost.

Further, since the guide and restricting mechanism 25 operates to lead the terminals 24, 24 of the fuse 22 to the elastic connecting parts 49, 54 respectively and further restrict the movements of the terminals 24, 24 of the fuse 22 under the activated condition, the positioning of the fuse 24 can be completed with ease.

In case of fitting the fuse carrying box 23 to the stationary box 21, the fitting position of the box 23 is also determined by the guide and restricting mechanism 25. Thus, owing to the provision of the mechanism 25, it is possible to bring the fuse 22 into the appropriate position with ease.

Now, providing that the fuse carrying box 23 is separated from the stationary box 21 for purpose of disconnecting the terminals 24, 24 of the fuse 22 from the elastic connecting parts 49, 54, it may be expected that the fuse carrying box 23 is deformed by resistance derived from the elastic connection between the terminals 24, 24 and the elastic connecting parts 49, 54. Nevertheless, according to the embodiment, the guide ribs 42, 42 on the fixed housing 26 operate to restrict the deformation of the box 23. Therefore, it is possible to detach the terminals 24, 24 of the fuse 22 from the elastic connecting parts 49, 54 while preventing the fuse 22 from falling down from the box 23.

Furthermore, when the locking levers 70, 70 are rotated to engage the engagement projections 71, 71 on condition of fitting the fuse carrying box 23 to the stationary box 21, the resultant fitting condition can be maintained. When it is desired to separate the box 23 from the stationary box 21, it is carried out to disengage the locking levers 70, 70 from the engagement projections 71, 71. Consequently, the fuse carrying box 23 can be detached from the stationary box 21 with ease.

In connection, since the locking levers 70, 70 are rotatably attached to both sides of the fuse carrying box 23 in the longitudinal direction, it is also expected to improve the efficiency in utilizing space in the neighborhood of the power breaking device 20.

Finally, it will be understood by those skilled in the art that the foregoing description is one embodiment of the disclosed power breaking device, and that various changes and modifications may be made to the present invention without departing from the spirit and scope of the invention.

What is claimed is:

1. A power breaking device for connecting a power source with an electric load through a fuse and for disconnecting the power source from the electric load by detachment of the fuse, the power breaking device comprising:

a stationary box comprising a power connection part for connecting to the power source, a load connection part for connecting to the electric load, a guide and restricting mechanism for guiding fuse terminals into the power connection part and the load connection part, and vertical insertion parts; and a fuse carrying box for accommodating and retaining the fuse therein, for being detachably attached to the stationary box, and for insulating the power source from the electric load when the fuse carrying box is detached from the stationary box, the fuse carrying box comprising a partition wall and side walls for insertion into the vertical insertion parts of the stationary box, wherein the guide and restricting mechanism guides the fuse terminals into the power connection part and the load connection part, and the partition wall and side walls of the fuse carrying box are inserted into the vertical insertion parts while the fuse carrying box is fitted to the stationary box.

2. The power breaking device of claim 1, wherein the stationary box further comprises:

a fixed housing;

a load-side bus bar having, on one end thereof, a load-side terminal for connecting to the electric load and having, on another end, a first elastic connecting part for connecting to one terminal of the fuse, the first elastic connecting part being retained in the fixed housing; and a power-side bus bar having, on one end thereof, a power-side terminal for connecting to the power source and having, on another end, a second elastic connecting part for connecting to another terminal of the fuse, the second elastic connecting part being retained in the fixed housing.

3. The power breaking device of claim 2, wherein the stationary box further comprises:

a box body detachably mounted to the stationary box; and a fuse fixing part arranged in the box body for accommodating the fuse therein.

4. The power breaking device of claim 3, wherein the guide and restricting mechanism is configured to guide connection of the fuse terminals with the first and second elastic connecting parts and to restrict movements of the fuse terminals when the fuse terminals are connected with the first and second elastic connecting parts.

5. The power breaking device of claim 4, wherein the guide and restricting mechanism comprises:

a partition wall formed integrally with the fixed housing to define an accommodating part for accommodating the fuse therein; and a pair of slits formed in the partition wall of the guide and restricting mechanism, wherein the fuse terminals are connected with the first and second elastic connecting parts via passage through the pair of slits.

6. The power breaking device of claim 4, wherein the fixed housing comprises at least one guide rib for being positioned outside the fuse carrying box and for being engaged with the stationary box to restrict deformation of the fuse carrying box.

7. The power breaking device of claim 4, further comprising a locking mechanism for locking the fuse carrying box in engagement with the stationary box, wherein the locking mechanism comprises a pair of locking levers rotatably attached to sides of the fuse carrying box, and a pair of engagement projections formed on the fixed housing for engagement with the locking levers.

* * * * *